3,600,249
Patented Aug. 17, 1971

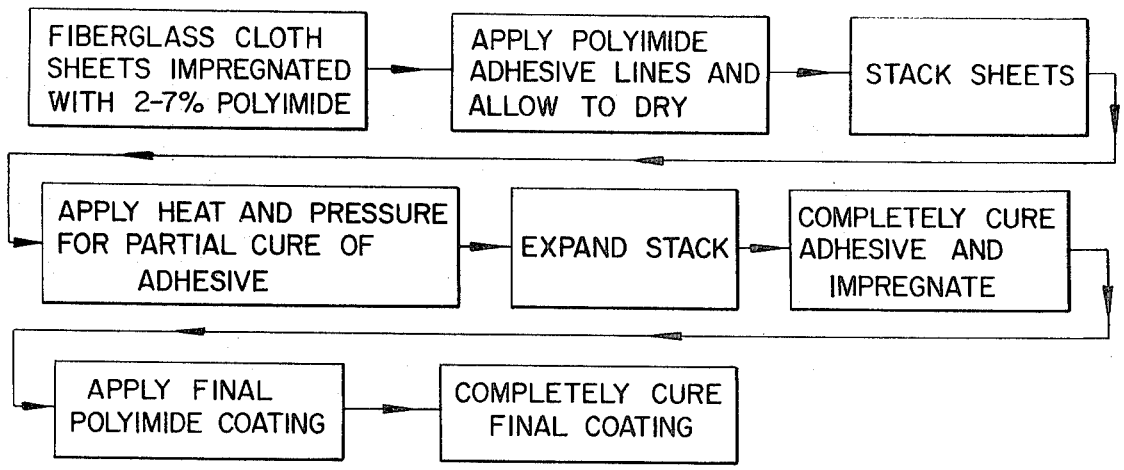
FIG_1
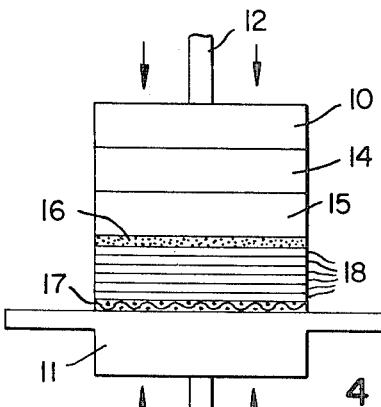
FIG_2
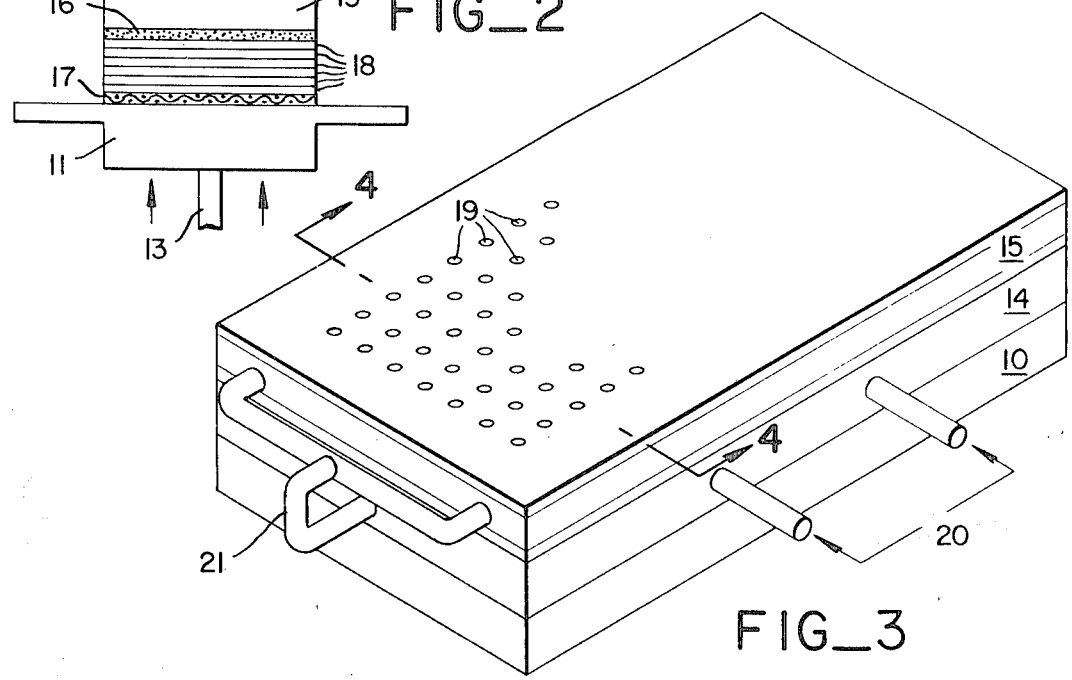
FIG_3
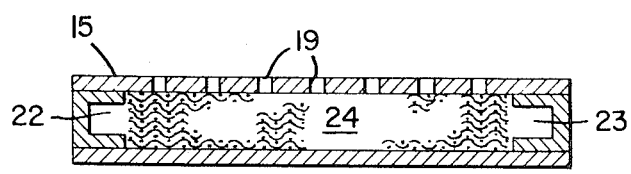
FIG_4

3,600,249
REINFORCED PLASTIC HONEYCOMB METHOD AND APPARATUS
Wendell T. Jackson, Pleasant Hill, John A. Stark, Berkeley, and Beverley R. Garrett, Moraga, Calif., assignors to Hexcel Corporation
Filed July 28, 1966, Ser. No. 568,647
Int. Cl. B31d 3/02; B32b 17/10
U.S. Cl. 156—197                                                12 Claims

ABSTRACT OF THE DISCLOSURE

A method and apparatus for constructing honeycomb from a fabric which tends to distort under its own weight. The fabric is impregnated with a slight amount of a resin impregnation material to give it sufficient body, preventing its distortion while allowing it to be flexibly deformed during expansion of the honeycomb. After the impregnation of the fabric, adhesive lines are applied thereto. Strips of the fabric are then stacked and subjected to heat to cure the adhesive and the stacks are expanded to give them the honeycomb configuration. Thereafter the impregnation material and adhesives are further cured and coated to rigidify the structure.

---

This invention relates to the production of reinforced plastic honeycomb by expansion techniques. More particularly, it relates to a method and apparatus for making such types of honeycomb in which heat and pressure activated adhesives are used for the bonding of adjacent sheets in a stack preparatory to their expansion to a honeycomb configuration.

Plastic honeycomb has been made utilizing a suitable reinforcing material, such as glass fibers, by the expansion process. In these prior methods a glass fiber mat was made up to contain about 30% by weight of resin. An adhesive which was capable of creating a bond between adjacent resin impregnated glass fiber mats at room temperature was necessarily utilized. The reason that a room temperature type of adhesive was required was because of the resin that was already impregnated in the glass fiber mat. If the adhesive required heat and pressure for activation to bond adjacent fiber glass mats, the resin in the mats would also be at least partially cured. As the resin impregnate cures the mats become rigid and expansion to a honeycomb configuration can not be achieved. A laminate of resin impregnated fiber glass mats would be the result. For this reason high temperature resistant plastic honeycomb, in which heat and pressure actuated high temperature resistant adhesives were utilized, has been made by a corrugation technique and not by an expansion method.

The present invention is designed to permit the use of adhesives that are activated or cured by application of heat and pressure. This type of adhesive is generally dry and nontacky after application to the resin impregnated reinforcing fabric. Because of this property, stacking of sheets to which the adhesive has been applied is facilitated and the obtaining of proper registery and alignment of the adhesive lines in each layer of the stack so that uniform honeycomb cells are produced is also promoted.

Perhaps the most important advantage of the present process permitting the use of heat and pressure cured adhesives is the choice of using such types of adhesives at all. In general, this type of adhesive after being cured is resistant to very high temperatures. Where the honeycomb structure is slated for an end use in which high temperatures will be encountered its use is required. All known room temperature curable adhesives do not have the ability to withstand extremely high temperatures such as may be encountered in space craft. Since the honeycomb is no stronger than the bond between sheets, a technique for utilizing the high temperature resistant adhesives such as those formed with polyimide resins is essential.

In accordance with the present invention, a way has been discovered for utilizing the more desirable expansion techniques in combination with heat and pressure curable high temperature resistant adhesives. In essence, the process contemplates the use of a flexible reinforcing fabric of the type that has heretofore been used, such as a fiber glass mat. This type of reinforcing fabric tends to distort under its own weight. Because of this it is not possible to bond plain fiber glass mats, expand them to a honeycomb configuration, and at that point impregnate the expanded structure with the desired resin. While this could avoid curing the impregnated resin during the adhesive bonding step (which would foreclose the use of expansion techniques as discussed above) the distortion of the fabric under its own weight before receiving the resin coating would lead to non-uniform honeycomb cells.

In the present method it has been found that it is possible to enhance the body of the reinforcing fabric with resin to avoid distortion without causing such a reduction in flexibility during curing of the adhesive so as to prevent later expansion. The key is in close control over the amount of resin initially impregnated into the reinforcing fabric. The amount utilized must be sufficient to create enough body in the fabric to prevent distortion under its own weight during and after expansion while being insufficient to destroy the fabric's flexibility following curing of the adhesive. Unexpectedly good results are obtained where the adhesive cure is held to the minimum needed for the bonds to hold during expansion, and after the expansion step the cure of adhesive and impregnate is completed.

Taking a flexible reinforcing fabric that has been impregnated with the controlled amount of uncured resin to achieve the above conditions, spaced parallel lines of resinous heat and pressure curable adhesive can be applied to the surface of the fabric. In this step it is important to prevent the adhesive from penetrating to the opposite surface of the fabric. If such penetration is allowed to occur, after the sheets are stacked and cured, bonds will occur at improper places so that the structure can not be expanded to the desired honeycomb configuration. Prevention of penetration to the opposite surface of the fabric is obtained by control over the viscosity and quantity of the adhesive applied to the fabric surface. These two parameters are interrelated. When viscosity is very high there is less danger of penetration and, therefore, quantity can be increased.

After the adhesive lines are applied they are advanced to a relatively non-tacky stage and this may be achieved simply by waiting a short period of time to allow excess volatile solvents to escape. The sheets can then be stacked with adhesive lines between adjacent layers in the stack in staggered relation to one another. Under application of heat and pressure the adhesive is cured sufficiently to create a bond between sheets strong enough to permit expansion of the stack to a honeycomb configuration. The heat and pressure may also at least partially cure the impregnated resin in the individual sheets in the stack. However, because the amount of resin has been carefully controlled it does not prevent expansion from occurring.

The amount of resin in the fabric prevents distortion and the uniformity of the honeycomb cells is retained at least long enough to permit the application of a final coating of any selected composition to the expanded honeycomb structure. In the preferred case this final coating will usually comprise more of the same type of resin used for the initial impregnation. However, it should be clear that any other type of final coating could be applied, including such divergent materials as plaster of paris, portland cement, aluminum phosphate, sulphur and others. The final coating can be accomplished in any desired manner, with some examples of techniques being powdered deposition, dispersion coating, solution coating, electrolytic deposition, chemical reaction and chemical reduction.

In the accompanying drawing:

FIG. 1 illustrates in flow sheet form the steps used in the practice of the present method.

FIG. 2 shows in schematic side elevation novel apparatus useful for bonding the heat and pressure activated adhesives that can be used in the present method.

FIG. 3 shows a perspective of the hot gas supplying portion of the apparatus of FIG. 2.

FIG. 4 shows in side section a portion of the apparatus of FIG. 3.

With reference to the drawing, fiber glass fabric has been selected as a typical reinforcing structure for the resin. It has advantage when coupled with polyimide impregnate and polyimide adhesives since all of these materials are capable of withstanding relatively high temperatures. It should be obvious that fabrics other than glass mat materials can be utilized. Alternative fabrics would include metal wire fabric or screen, synthetics such as nylon, polyester, rayon and cellulosic and natural fiber materials such as cotton, silk, Ramie and the like.

To begin the preparation of a honeycomb structure, fiber glass fabric is provided that is impregnated with the selected resin. Using the preferred polyimide, sufficient resin is employed to cause the fiber glass fabric to have sufficient body to prevent its distorting under its own weight while permitting expansion after curing of the adhesives. The amount utilized will depend on the type of reinforcing fabric selected and the properties such as density of the particular material selected within that type. As an example, glass fabric having a density of 1.43 oz./sq. yd. will require about 2–7% by weight of uncured polyimide resin by weight of the fiber glass fabric to provide the desired body and flexibility properties.

When utilizing glass fibers for the reinforcing structure, preferred practice is to employ fibers having an organic finish layer such as Union Carbide A–1100, which is an aminopropyl triethoxy silane. The finish can be degraded at elevated temperature. In the present process, it has been found that the impregnated resin will protect the finish during heating to activate the adhesive if used in sufficient quantity. In the example given of polyimide resin and glass fiber the proportion of resin indicated will also adequately serve to protect the finish.

As indicated in the flow sheet, the next step is to apply adhesive lines on the impregnated fiber glass fabric. This may be accomplished by any technique which will lay down a plurality of uniformly spaced apart parallel lines of adhesive on the surface of the fabric. A preferred technique is to utilize a roll having grooves or etched depressions. The grooves are suitably filled with adhesive and the area on the roller between grooves cleaned with a doctor blade for example. If the roll is then turned in contact with the surface of the impregnated glass cloth, adhesive will be applied in accordance with the groove pattern on the roll.

The critical aspect at this stage is to avoid penetration to the opposite side of the fiber glass mat. By controlling the quantity and viscosity of the adhesive, penetration to undesired areas is prevented. Again, this will depend on the nature and composition of the impregnated fabric and the adhesive. Utilizing a heat and pressure curable polyimide adhesive such as Amoco AI–11 polyamide-polyimide polymer (conveniently applied in about a 45% solids solution in dimethyl formamide solvent) a 14,000–20,000 cps. at 70° F., Brookfield viscosity may be obtained. If this adhesive is applied along parallel lines to fiber glass impregnated with about 2–7% of polyimide resin and the total weight of the adhesive forming these lines constitutes about 2–5% by weight (solids) relative to the total weight of the fabric and impregnated uncured resin (including its residual solvent), it has been found that undesired penetration to the opposite side of the fabric is avoided.

The adhesive is then advanced to a relatively non-tacky stage. With the example given this occurs by itself at ambient temperature in a few minutes. The sheets are then stacked with adhesive lines between layers in staggered relation to one another. Heat and pressure are applied to the stack to cause the adhesive to flow and bond to the surface of the next adjacent sheet in the stack. In the preferred case the adhesive cure is carried just far enough to create a bond that will not be ruptured when the stack is expanded.

After bonding the sheets the stack is expanded in the usual fashion to create a honeycomb configuration. In the preferred case, since the cure of the adhesive and impregnated resin was not carried to completion before expansion, it is again subjected to heat for a sufficient period of time to fully cure the resin and adhesive. This creates a structure of sufficient rigidity to support any desired final type coating.

One technique for applying a final coating is to dip the new rigid honeycomb structure in a supply of material. In the example under discussion, the structure can be dipped in a reservoir of polyimide of the same type used for the initial impregnation of the glass cloth. Following the dipping, the entire structure may be completely cured at a suitable temperature.

In the preferred case utilizing polyimide resin, certain techniques have been developed for the partial cure of the adhesive preparatory to expansion. The polyimide used for impregnating the glass fiber necessarily contains some residual solvent. If heat and pressure are applied to the stack without providing for immediate removal of the solvent, bonding of the layers will occur in the zones between the adhesive lines in each layer to create a laminate that cannot be expanded. In accordance with the present discovery it has been found that if the residual solvent is removed during application of heat, bonding between adhesive lines can be avoided and flexibility and expandability retained. In the embodiment illustrated in FIGS. 2 through 4, solvent removal is accomplished by flowing air through the stack while raising the temperature of the stack. This is best accomplished by using the air itself to heat the stack to adhesive curing temperature.

In the example given involving polyimide resin and adhesive it is found that hot gas such as air should be flowed through the stack at a rate of at least about .05 cubic feet per minute for each square inch of fabric in the stack in order to avoid fabric adhesion and bonding of the resin between adhesive lines.

In order to flow gas through the stack it is apparent that the stack itself must be porous. Thus, where polyimide resins are employed, the reinforcing fabric selected must be porous and must be retained in such a form after being impregnated with resin preparatory to stacking and bonding of adhesive. The quantities of resin discussed earlier which are suited to increasing body while retaining flexibility has been found to also retain the porosity of the fabric such as glass fabric mat.

A novel structure has been provided for bonding sheets preparatory to expansion which will provide the necessary gas flow and residual solvent removal. This structure is illustrated in FIGS. 2, 3 and 4. In general, the structure comprises a pair of opposed electrically heated platens 10 and 11 which are mounted on shafts 12 and 13, respectively. Either shaft 12 or 13 is suitably connected to a hydraulic cylinder or other mechanism for applying and releasing pressure on the other components illustrated.

Heat exchanger 14 is joined to and disposed beneath platen 10. Aerating plate 15 is depended from heat exchanger 14. A porous insulation layer, which may be nothing more than a plurality of non-impregnated glass fiber mats 16, is inserted beneath aerating plate 15.

A porous support such as screen 17 is utilized upon which a stack of impregnated fiber glass mats having adhesive lines to be bonded is stacked. Insulating layer 16 with aerator plate 15, heat exchanger 14 and platen 10 are brought into contact with stack 18 and desired pressure applied. Hot air is passed through stack 18 by flowing the air outwardly from aerator plate 15 through discharge ports 19 which are uniformly disposed over the lower surface of plate 15.

Air is drawn from the exterior through inlet conduits 20 into heat exchanger 14 wherein heat generated and transferred from electrically heated platen 10 raises the temperature of the air. The air enters aerator plate 15 through connecting conduit 21 through longitudinal channels 22 and 23 of aerator plate 15. The heated air then moves towards the central portion 24 of aerator plate 15 and is distributed by a screen mesh therein. Uniformly flowing hot air proceeds through discharge ports 19, through insulating layer 16, through stack 18, and out through porous support screen 17.

Platen 11 may also be suitably heated electrically to maintain a uniform temperature through the stack and avoid undue cooling of the air at the discharge side of the stack. Insulating layer 16 serves to prevent excessive heating in the part of the stack closest to aerator plate 15 which might cause lamination of the stack to occur before aeration begins at full hydraulic loading of the stack.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A method for making reinforced plastic honeycomb by the expansion process comprising: providing a flexible reinforcing fabric of the type that distorts under its own weight, said fabric being impregnated with uncured resin in an amount sufficient to create enough body in said fabric to prevent said distortion while substantially retaining the fabric's flexibility when the resin is at least partially cured, applying spaced parallel lines of resinous heat and pressure curable adhesive on the surface of said impregnated fabric, said adhesive being of selected viscosity and quantity so that adhesive does not penetrate to the opposite surface of said fabric, advancing said adhesive lines to a relatively non-tacky stage, stacking a plurality of said impregnated sheets with adhesive lines between adjacent layers in the stack in staggered relation to one another, partially curing said adhesive under heat and pressure sufficiently to create a bond between sheets strong enough to permit expansion of the stack to a honeycomb configuration, said heat and pressure also only partially curing said impregnated resin, expanding the bonded stack to a honeycomb configuration, and applying a final coating of a selected composition to the expanded honeycomb structure.

2. A method in accordance with claim 1 wherein said flexible reinforcing fabric is formed with glass fibers.

3. A method in accordance with claim 2 wherein said fiber-glass reinforcing fabric contains an organic finish layer on the glass fibers and said impregnated uncured resin is present thereover in an amount sufficient to protect the finish during curing.

4. A method in accordance with claim 1 wherein said final coating is formed from the same type of resin as said impregnated uncured resin.

5. A method in accordance with claim 1 wherein the heat and pressure applied for curing said adhesive prior to expansion is controlled so that the cure of the adhesive is advanced only far enough to create the necessary strength for expansion with substantially no curing beyond that point, whereby curing of the impregnated resin is minimized and reduction in flexibility of the fabric is in turn minimized.

6. A method in accordance with claim 5, including the step of substantially completely curing the adhesive and impregnated resin after said expansion step and before application of said final coating.

7. A method for making a high temperature resistant reinforced plastic honeycomb by the expansion process comprising: providing a gas porous flexible reinforcing fabric of the type that distorts under its own weight and formed from relatively high temperature resistant fibers, the body of said fabric being increased by impregnation with an uncured polyimide resin and residual solvent therefor, said uncured resin being present in an amount which substantially retains the flexibility and porosity of the fabric while preventing said distortion, applying spaced parallel lines of a heat and pressure curable polyimide adhesive on the surface of said impregnated fabric, said adhesive having a viscosity and being applied in a quantity so that the adhesive does not penetrate to the opposite surface of the fabric, advancing said polyimide adhesive lines to a relatively non-tacky stage, stacking a plurality of said impregnated sheets with adhesive lines between adjacent layers in the stack in staggered relation to one another, applying pressure to said stack and heating the stack to curing temperature by flowing a hot gas through the pores of the sheets in said stack at a rate which removes the residual solvent from said impregnated polyimide resin and retains expansion flexibility in the stack, said pressure and hot air flow being continued to create a bond along the adhesive lines between adjacent sheets in the stack just sufficient to permit expansion of the stack to a honeycomb configuration without rupture of the bond along the adhesive lines, expanding said bonded stack to a honeycomb configuration, then substantially completely curing the polyimide adhesive and impregnated resin, applying a final coating of a polyimide resin to said expanded honeycomb structure, and curing the final coating of polyimide resin.

8. A method in accordance with claim 7 wherein said final coating of polyimide resin is applied by dipping the expanded honeycomb in a supply of polyimide resin.

9. A method in accordance with claim 7 wherein said reinforcing fabric is formed with glass fibers and the uncured impregnated polyimide resin constitutes about 2–7% by weight of the fiber-glass fabric.

10. A method in accordance with claim 7 wherein the polyimide adhesive has a viscosity of about 14,000–20,000 cps. (70° F., Brookfield viscometer) and constitutes about 2–5% by weight (solids) relative to the total weight of the fabric and impregnated uncured resin with its residual solvent.

11. A method in accordance with claim 7 wherein the hot gas flowed through said stack is air and the air is flowed at a rate of at least about .05 cubic feet per minute for each square inch of fabric in the stack.

12. In the method for making glass-fiber reinforced plastic honeycomb by expanding intermittently bonded, flat sheets, the improvement comprising: bonding reinforcing sheets preparatory to expansion with a heat and pressure activated adhesive, and including the steps of initially impregnating the sheets with sufficient resin to give them enough body for shape retention after expansion but insufficient to impair their flexibility and capability for expansion after only partially curing the resin, applying adhesive lines to said impregnated sheets and stacking the sheets in a manner providing a honeycomb structure after adhesive bonding and expansion, bonding adjacent stacked sheets by partially curing said adhesive under heat and pressure just sufficient to permit expansion without rupture of the adhesive bond, expanding said sheets to a honeycomb configuration, and then completing the curing of the adhesive and impregnated resin.

References Cited

UNITED STATES PATENTS

| | | | |
|---|---|---|---|
| 2,606,133 | 8/1952 | Havens | 161—69X |
| 3,130,101 | 4/1964 | Gittins et al. | 156—285X |
| 3,179,635 | 4/1965 | Frost et al. | 260—78 |
| 3,247,165 | 4/1966 | Rodia | 161—197X |
| 3,251,727 | 5/1966 | Reynolds et al. | 161—148 |
| 3,264,250 | 8/1966 | Gall | 260—47X |
| 3,272,686 | 9/1966 | Smith et al. | 156—197X |
| 3,311,525 | 3/1967 | Fanuzzi et al. | 156—497 |
| 3,345,342 | 10/1967 | Angelo | 161—227X |
| 3,349,061 | 10/1967 | Pruckmayr | 161—227X |
| 2,321,756 | 6/1943 | Kyle | 34—145 |
| 2,983,640 | 5/1961 | Knoll et al. | 156—197 |
| 3,253,351 | 5/1966 | Bettanin | 34—145X |

JOHN T. GOOLKASIAN, Primary Examiner

H. F. EPSTEIN, Assistant Examiner

U.S. Cl. X.R.

156—285; 161—197